(12) United States Patent
Burger et al.

(10) Patent No.: US 12,501,147 B2
(45) Date of Patent: Dec. 16, 2025

(54) METHOD FOR OPERATING A THERMAL IMAGING DEVICE DEPENDING ON A CURRENT USE SITUATION, AND THERMAL IMAGING DEVICE

(71) Applicant: Carl Zeiss AG, Oberkochen (DE)

(72) Inventors: Victor Burger, Heidenheim (DE); Tammo Sebastian Lueken, Rosbach vor der Höhe (DE); Christoph Stark, Ellwangen (DE)

(73) Assignee: Carl Zeiss AG, Oberkochen (DE)

( * ) Notice: Subject to any disclaimer, the term of this patent is extended or adjusted under 35 U.S.C. 154(b) by 104 days.

(21) Appl. No.: 18/232,294

(22) Filed: Aug. 9, 2023

(65) Prior Publication Data

US 2024/0056678 A1 Feb. 15, 2024

(30) Foreign Application Priority Data

Aug. 9, 2022 (DE) ...................... 10 2022 208 292.3

(51) Int. Cl.
*H04N 23/60* (2023.01)
*G01J 5/00* (2022.01)
(Continued)

(52) U.S. Cl.
CPC .......... *H04N 23/633* (2023.01); *G01J 5/0804* (2022.01); *G01P 15/18* (2013.01);
(Continued)

(58) Field of Classification Search
CPC .... H04N 23/633; H04N 23/611; H04N 23/64; H04N 23/63; H04N 5/33; H04N 23/61;
(Continued)

(56) References Cited

U.S. PATENT DOCUMENTS 6,417,797 B1 7/2002 Cousins et al.
7,977,634 B2 7/2011 Thiele et al.
(Continued)

FOREIGN PATENT DOCUMENTS

DE 102009009360 B4 1/2012
DE 202009018709 U1 12/2012
(Continued)

OTHER PUBLICATIONS

Kleiner, Bernhard; Munkelt, Christoph; Thorhallsson, Torfi et al.: „Handheld 3-D Scanning with Automatic Multi-View Registration Based on Visual-Inertial Navigation. International Journal of Optomechatronics, Nov. 4, 2014, pp. 313-325, ISSN 1559-9612, 8:4, Taylor & Francis Group, Stuttgart, Germany.
(Continued)

*Primary Examiner* — Usman A Khan
(74) *Attorney, Agent, or Firm* — Ewers IP Law PLLC; Falk Ewers

(57) ABSTRACT

A method is provided for operating an electro-optic observation device, in particular a thermal imaging device, which includes an electronic viewfinder, a proximity sensor and a position sensor. According to the method, a predefined distance range in front of the viewfinder is monitored for a presence of a user with the proximity sensor, a position variable which is characteristic of the orientation of the observation device is captured with the position sensor, information concerning a current use situation of the observation device is derived from the presence of the user within the distance range and/or the position variable, and at least one specific function of the observation device that influences an image display is activated or at least enabled depending on the information concerning the current use situation.

15 Claims, 2 Drawing Sheets

(51) Int. Cl.
*G01J 5/0804* (2022.01)
*G01P 15/18* (2013.01)
*H04N 23/611* (2023.01)
*H04N 23/63* (2023.01)

(52) U.S. Cl.
CPC .......... *H04N 23/611* (2023.01); *H04N 23/64* (2023.01); *G01J 2005/0077* (2013.01)

(58) Field of Classification Search
CPC ................ H04N 23/23; G01J 5/0804; G01J 2005/0077; G01J 5/06; G01J 5/02; G01J 5/0265; G01J 5/068; G01J 5/084; G01J 5/0846; G01P 15/18
USPC ..................................................... 348/333.02
See application file for complete search history.

(56) References Cited

U.S. PATENT DOCUMENTS

| | | | |
|---|---|---|---|
| 10,095,026 B2 | 10/2018 | Eineren et al. | |
| 10,154,126 B2 | 12/2018 | Connell | |
| 10,504,345 B2 | 12/2019 | Glock | |
| 10,521,942 B2 | 12/2019 | DeBates et al. | |
| 12,008,157 B2 * | 6/2024 | Alam | G06F 3/013 |
| 2009/0293012 A1 | 11/2009 | Alter et al. | |
| 2010/0031169 A1 | 2/2010 | Jang et al. | |
| 2013/0123015 A1 * | 5/2013 | Jung | G06V 10/147 463/37 |
| 2013/0154906 A1 * | 6/2013 | Braun | G06F 1/325 345/8 |
| 2013/0235163 A1 * | 9/2013 | Joo | G03B 35/08 348/47 |
| 2014/0282911 A1 * | 9/2014 | Bare | H04L 67/131 726/4 |
| 2015/0015461 A1 * | 1/2015 | Morimoto | A61B 5/742 345/8 |
| 2015/0025788 A1 | 1/2015 | Crain et al. | |
| 2015/0062557 A1 * | 3/2015 | Giacotto | G01S 7/484 356/5.01 |
| 2015/0156716 A1 * | 6/2015 | Raffle | G06F 1/325 250/206 |
| 2017/0115729 A1 * | 4/2017 | Han | G06F 1/163 |
| 2017/0332234 A1 * | 11/2017 | Lunardhi | G01K 1/02 |
| 2018/0322681 A1 * | 11/2018 | Inomata | A63F 13/211 |
| 2019/0079290 A1 * | 3/2019 | Katagiri | B62J 50/22 |
| 2020/0293788 A1 * | 9/2020 | Liang | H04N 23/54 |
| 2020/0403453 A1 * | 12/2020 | Sherman | H02J 50/80 |
| 2021/0240275 A1 * | 8/2021 | Browne | G06F 3/014 |
| 2021/0396586 A1 * | 12/2021 | Price | A61B 5/4887 |

FOREIGN PATENT DOCUMENTS

| | | |
|---|---|---|
| DE | 102015102557 A1 | 8/2016 |
| DE | 102015111728 A1 | 1/2017 |
| DE | 102017112547 A1 | 12/2017 |
| DE | 102018120773 A1 | 3/2019 |
| DE | 102014003178 B4 | 9/2021 |
| GB | 2444878 A | 6/2008 |
| WO | 2007061322 A1 | 5/2007 |

OTHER PUBLICATIONS

Office Action issued in German Patent Application No. DE 10 2022 208 292.3, dated Apr. 15, 2023 (from which this application claims priority) and English language translation thereof.

* cited by examiner

METHOD FOR OPERATING A THERMAL IMAGING DEVICE DEPENDING ON A CURRENT USE SITUATION, AND THERMAL IMAGING DEVICE

CROSS REFERENCE TO RELATED APPLICATIONS

This application claims priority to German patent application DE 10 2022 208 292.3, filed Aug. 9, 2022, the entire content of which is incorporated herein by reference.

TECHNICAL FIELD

The disclosure relates to a method for operating an electro-optic observation device. Furthermore, the disclosure relates to an electro-optic observation device.

BACKGROUND

Optical observation devices are used, inter alia, during observation of nature and animals and (e.g., also in association therewith) also during hunting. Such observation devices are often binoculars or spotting scopes (the latter are commonly also referred to as "telescopes"). In the case of electro-optic observation devices, the functional scope thereof is often extended in order that "phenomena" outside the visual spectral range or below a brightness required for the human eye are made accessible to a user. In particular, mention may be made here of the representation of heat signatures and/or residual-light-intensified images which make it possible to observe objects even in (in particular subjective) darkness. Such functions are usually used in thermal imaging devices or else in night vision devices. In this case, usually in a departure from purely optical observation devices the incident radiation is passed on to a person using the observation device (for short: a user) not by optical means but rather indirectly via image converter devices (also: image sensor, photodetector or, in the case of thermal imaging devices, also (micro-)bolometer). In such cases, therefore, the image that can be viewed by the user is usually a display generated on the basis of the incident radiation and usually after processing (image processing) has been carried out.

In the case of modern electro-optic observation devices, the user usually has the possibility of adapting the—often electronically generated—display at least in part to said user's requirements; e.g., a brightness, a contrast, a magnification factor or the like. In this case, in a manner similar to that in the case of a camera, the user can often select and vary settings (usually formed by variable parameters) on the basis of a menu represented within the display. For this purpose, pushbuttons used for menu navigation, in particular for selecting and adapting the settings, are usually arranged on the observation device.

Electro-optic observation devices are usually battery-operated, and so operation that is as energy-efficient as possible is also expedient.

SUMMARY

It is an object of the disclosure to improve the use of an electro-optic observation device.

The object is achieved with a method for operating an electro-optic observation device, in particular a thermal imaging device, as described herein. Furthermore, the object is achieved with an electro-optic observation device, as described herein.

The method according to an aspect of the disclosure serves for operating an electro-optic observation device. This electro-optic observation device is typically a thermal imaging device. The observation device includes an electronic viewfinder. Moreover, the observation device includes a proximity sensor and/or a position sensor. The observation device typically also includes an object-side optical unit and particularly typically an image capture device, in particular an image converter (also: "detector", in the case of the thermal imaging device specifically in particular a (micro-)bolometer).

According to the method, a predefined distance range in front of the (electronic) viewfinder (i.e., in particular outside a housing of the observation device) is monitored for presence of a user with the proximity sensor. In addition or as an alternative to the monitoring of the distance range, a position variable that is characteristic of the orientation of the observation device is captured with the position sensor. Information concerning a current use situation of the observation device is subsequently derived from the presence of the user within the distance range and/or the position variable. At least one specific function of the observation device that influences an image display is then activated or at least enabled depending on the information concerning the current use situation.

The "characteristic position variable" is, in particular, a variable from which the position of the observation device (in particular in space, optionally relative to the gravitational vector) can be ascertained directly or indirectly. By way of example, in this case, the position variable can represent the position of a predefined axis (e.g., an optical axis, radiation transmission axis or the like) in space and can describe this, e.g., in the form of an angle signal of an inclination sensor—which represents the position sensor in this case, for example. Said angle signal represents, e.g., the angle of said axis relative to a horizontal. Optionally, however, the position sensor can also capture the three-dimensional position of the observation device, in particular of the axis mentioned above, in space and output it with corresponding measurement signals. In particular, a movement of the observation device can also be ascertained from a temporal profile of the position variable.

Thus—to put it another way—in the case of an electro-optic observation device the position thereof (in particular the orientation thereof in space) is captured and/or the fact of whether a user is near the viewfinder is monitored. The position and/or the presence of the user are/is used jointly or individually as criteria as to whether the abovementioned function for image display can be activated or deactivated.

The procedure described above thus advantageously makes it possible for a functionality of the observation device to be carried out typically automatically or by the observation device itself, in particular without the user themselves needing to become active here.

In one expedient method variant, the electronic viewfinder is deactivated (in particular as the abovementioned function that influences the image display) if the information contains at least absence of the user within the distance range. To put it another way, the viewfinder is deactivated if the proximity sensor outputs a signal that indicates the absence of the user. Particularly typically, the viewfinder is deactivated in particular if the fact that the distance between the user and the observation device, specifically the viewfinder, has just increased is ascertainable from the signal, in particular the temporal signal profile thereof. This indicates that the user is just putting down or has just put down the observation device. Deactivation (i.e., in particular switching off) of the viewfinder, that is to say in particular of an internal screen (display) constituting part of the viewfinder, here has firstly an energetic advantage (a switched-off screen consumes no or only negligible energy) and secondly also an emission advantage, since with an observation device having been put down, the active screen would also "shine light" into the surroundings. Particularly in an application during hunting, it is possible in this way—particularly when darkness prevails otherwise—advantageously to avoid the shining of light that may disturb animals in the wild.

Typically, the electronic viewfinder is formed by the screen, which is arranged, in particular, in the housing of the observation device, and an eyepiece disposed downstream of said screen in a radiation transmission direction or in the sense of an image flow of the observation device. In this case, the screen serves for displaying an image captured with the image capture device (image converter, detector) of the observation device. Optionally, a lens group is assigned to the eyepiece, e.g., interposed between the screen and the eyepiece.

In an optional method variant, the electronic viewfinder is deactivated if a, typically user-specifically settable, first waiting time since registration (recognition) of the absence of the user within the distance range has additionally lapsed without renewed presence of the user having been recognized. By way of example, 2 to 10, in particular up to 5, seconds can be used as the first waiting time.

Alternatively, an immediate (i.e., in particular undelayed) deactivation of the viewfinder, in particular the screen thereof, is carried out.

Additionally or alternatively, the electronic viewfinder can also be deactivated depending on (in particular only) the position variable. For this purpose, by way of example, the position variable, in particular the temporal profile thereof, is evaluated in regard to a movement that is characteristic of putting down the observation device from the eye. If the profile indicates such a putting down movement (e.g., tilting away of the observation device by approximately 90 degrees and movement of the observation device downwards), this is optionally interpreted as putting down and the viewfinder is deactivated—optionally after a predefined waiting time (e.g., the first waiting time mentioned above) of, e.g., 3 to 30 seconds, in particular for approximately 10 seconds, has elapsed.

Putting down is thus deduced from, e.g., a temporal profile of the position variable which indicates tilting away of the observation device (e.g., of the optical axis or the like), in particular downwards (that is to say that an entrance opening of the observation device faces downwards), and subsequent or simultaneous movement of the entire observation device downwards. By contrast, a correspondingly inverted profile indicates in particular guiding to the face or eye, also referred to as "putting in position".

In a method variant that is advantageous with regard to reducing an energy consumption in the observation device, a standby state of the observation device is activated (in particular as the abovementioned function that influences the image display) if the abovementioned information additionally indicates (in particular in addition to the absence of the user in the distance range in front of the viewfinder) non-use, in particular putting down (typically, e.g., also laying down) and/or non-movement, of the observation device. Such a situation is present for example if the user firstly is no longer looking through the viewfinder and then lays down the observation device or carries it on (e.g., slung from) a carrying strap. In this case, it can usually be assumed that renewed use is not imminent, or is at least not imminent within a short time, e.g., within the next three minutes. Both the proximity sensor and the position sensor are thus typically used in this method variant. Optionally, the function for automatic activation of the standby state can also be implemented without prior detection of the absence. In this case, it is thus also possible to dispense with the use of the proximity sensor and to check only the abovementioned information in regard to the non-use.

Particularly, in order to avoid incorrect recognitions of a non-use, in one advantageous development of the method variant described above, the activation of the standby state is prevented if the non-movement was already present before the registration of the absence of the user. Such a situation is present for example if the observation device, e.g., in the form of the thermal imaging device, rests on a stand or a stable support and the user (e.g., a hunter) is looking into the viewfinder, without moving the observation device. In such cases, moving away from the viewfinder often occurs only for a short time, and so switching over to the standby state here would prevent the user from their intended operational control. Conversely, the activation of the standby state is thus advantageously enabled if, after the moving away from the viewfinder, initially a movement is still detected, but no more movement is detected after that. This is the case, e.g., if the observation device is laid down.

In one particularly expedient method variant, after the registration of the non-use, in particular the putting down and/or non-movement, and typically also after the registration of the absence of the user, the activation of the standby state is preceded by waiting for a second waiting time to elapse, within which the observation device is not operated (i.e., settings effected) or is moved in such a way that this indicates a use (e.g., renewed putting in position). Optionally, this second waiting time is not started until after registered putting down (that is to say optionally also without detection of the absence, e.g., if no proximity sensor is present). Typically, however, the second waiting time is started only if the absence and the non-use have been recognized. This second waiting time advantageously makes it possible for the user to resume the use of the observation device within this second waiting time, without having to reactivate the observation device. By way of example, the second waiting time is 5 to 300 seconds, e.g., around approximately 60 to 120 seconds.

In a further expedient method variant, which is advantageous and provided in particular for application with the thermal imaging device, a closing function of a shutter in the beam path upstream of the image converter of the thermal imaging device is enabled (in particular as the abovementioned function that influences the image display) if the information contains at least absence of the user within the distance range. In the case of thermal imaging devices, the closing of the shutter here regularly serves to provide a radiation situation that is as homogeneous as possible for the image converter. The homogeneous radiation situation can be used for "temperature compensation" or else for thermal calibration, in particular since the image converter, for example the microbolometer or else a similar detector, is subjected to a temperature drift. In this variant, the use and the presence of the position sensor are not absolutely necessary and can therefore also be dispensed with in an exemplary embodiment that forms an independent disclosure.

By contrast, the closing function of the shutter is typically prevented during the use of the thermal imaging device, in particular during the presence of the user in the distance range. A disturbance of the user (which often occurs on account of an image that is frozen for a short duration) can be avoided in this case.

Alternatively, however, the closing function can in principle also be enabled only on the basis of the position sensor or further information. In this regard, it is sufficient, for example, if the information generally indicates non-use of the thermal imaging device, without the proximity sensor outputting a corresponding "absence signal" (and this also allowing it to be dispensed with in the case of an independent disclosure). By way of example, in this case, information can be derived only from the position variable if sufficiently long motionlessness or else orientation in a non-use position (e.g., hanging) is recognized. Alternatively (i.e., in particular in the context of a further independent disclosure) or additionally, the closing function can also be enabled if for a comparatively long time, e.g., for at least 5 seconds, but in particular at least 10 seconds, typically for at least 30 seconds, e.g., for 60 seconds, operational control of the thermal imaging device by the user has no longer occurred, that is to say in particular there has no longer been an alteration of any setting on the thermal imaging device, that is to say, e.g., there has been no zooming, focusing or the like. Still further alternatively (i.e., in particular in the context of a further independent disclosure) or additionally, the closing function can also be enabled if a connection to a wireless device is no longer present for a comparatively long time, e.g., for at least 5 seconds, but in particular at least 10 seconds, typically for at least 30 seconds. In this case, the thermal imaging device typically includes a wireless interface for communication with such a wireless device (e.g., a smartphone). Optionally, in this case, the thermal imaging device can be configured to receive control inputs, e.g., the above-described alteration of zoom or focus settings, but also color settings, from the wireless device (on which a control application is typically installed in this case) or (in a simple exemplary embodiment) to transmit images to the wireless device. If a connection to the wireless device is absent, it is thus assumed that it is highly probable that the thermal imaging device is not being currently used any more.

In one expedient method variant, however, the closing function is also enabled during the use of the thermal imaging device (i.e., during the viewing of an image in the viewfinder) if a critical limit value for at least one temperature value captured for the (in particular at the) image converter (or for a temperature difference of this temperature value relative to a previous closing of the shutter) is exceeded. This is because in such a case there is often an almost complete loss of contrast (in particular on account of so-called fixed pattern noise) in the captured and represented image, which can in turn advantageously be avoided with this method variant. This critical limit value is optionally present in addition to a threshold value possibly used for the standard triggering of the closing function, since the standard triggering is typically prevented during the use of the thermal imaging device, as described above.

In a further expedient method variant, the closing function is enabled during a process of starting the thermal imaging device.

In a further expedient method variant, the closing function is not only enabled, but in particular also forced (i.e., "compelled") during the first and/or the second waiting time (that is to say before the standby state is initiated). To put it another way, the closing of the shutter during the corresponding waiting time is deliberately triggered in order that the closing is still carried out during the waiting time and before possible resumption of the use of the thermal imaging device or before the activation of the standby state.

Particularly in order to be able to offer the user an image which is captured with a currently "calibrated" image converter, in accordance with one advantageous method variant, the position variable (captured with the position sensor) is evaluated to the effect of whether a movement that is characteristic of guiding the thermal imaging device to the face, in particular putting it in position at the face, is present. If this is the case (i.e., if such a movement is recognized), the closing function is, typically immediately, triggered (i.e., in particular forced). The closing of the shutter and thus the temperature compensation ("calibration" or "referencing") can thus take place while the user (picks up and) puts in position the thermal imaging device.

In one exemplary method variant, a 3-axis acceleration sensor is used as the position sensor. As a result, the position of the observation device in space can be captured comparatively easily and unambiguously with a comparatively compact sensor.

In order to recognize (detect or register) a specific movement, in particular the putting down, putting in position and/or a specific position (e.g., the rest position, a position slung from the carrying strap, a transport position, a typical use orientation or the like) of the observation device, in one advantageous method variant, pattern recognition is applied to a signal of the position sensor. In one simple form, a comparison with stored known (movement) patterns is carried out here. Optionally, however, e.g., a self-learning algorithm that is learned (in particular in closed fashion) is also used in this case.

Expediently, the electronic viewfinder (which in particular has been deactivated in response to the absence of the user in the predefined distance range) is correspondingly conversely also activated again if an approach to the viewfinder by the user, i.e., in particular the renewed presence of the user within the distance range, is registered.

In principle, it can be advantageous also to use a temperature sensor, in particular an infrared (IR) temperature sensor, in addition to the proximity sensor. For example, a temperature change in front of the viewfinder can be recognized with the temperature sensor, which temperature change indicates the presence of the user, and so a differentiation from an "inanimate" object in front of the viewfinder is in turn possible. This can be advantageous in order to avoid activation of the viewfinder when the observation device is packed away in a bag or the like.

In one particularly expedient method variant, the standby state is likewise deactivated (again) depending on the information about the current use situation. In this case, the information is also referred to as "wake-up information". In particular, the wake-up information contains the fact that a position change and/or movement (optionally one still taking place), in particular one allowing the conclusion to be drawn about the observation device being picked up by the user, have/has been registered with the position sensor. Typically, therefore, even during the standby state, the position sensor continues to be operated and monitoring for position changes and/or movements is effected. Optionally, in this case, the position sensor is operated with a reduced power consumption by comparison with nominal operation. For example, in this case, the position sensor is interrogated only at intervals (if appropriate lengthened intervals by comparison with nominal operation). If a position change and/or movement are/is registered here, same are/is evaluated (e.g., with the pattern recognition described above) to the effect of whether merely a random movement, e.g., in a bag of the user is involved or whether the movement indicates that the observation device is being raised/picked up and possibly guided to the eye (put in position). In the latter case, advantageously, the observation device is automatically activated again, in particular the distance range is monitored (again) with the proximity sensor as well, in order to be able to activate the viewfinder again, if appropriate.

The electro-optic observation device according to an aspect of the disclosure, as is also evident from the description above, includes the electronic viewfinder as well as, the proximity sensor for monitoring the predefined distance range in front of the (electronic) viewfinder for presence of a user, and/or also the position sensor for capturing the position variable that is characteristic of the orientation of the observation device. Moreover, the observation device includes a control device configured to carry out the above-described method in particular automatically.

The observation device and the method described above thus share the same physical features evident from the description and also the advantages arising therefrom. Equally, however, the observation device is also configured (with the control device) to carry out the above-described method variants—optionally in interaction with the user.

Here and hereinafter, the conjunction "and/or" should be understood to mean in particular that the features linked with this conjunction can be embodied both jointly and as alternatives to one another.

BRIEF DESCRIPTION OF THE DRAWINGS

The invention will now be described with reference to the drawings wherein.

DESCRIPTION OF EXEMPLARY EMBODIMENTS

Mutually corresponding parts are always provided with the same reference signs in all the figures.

Figure 1:
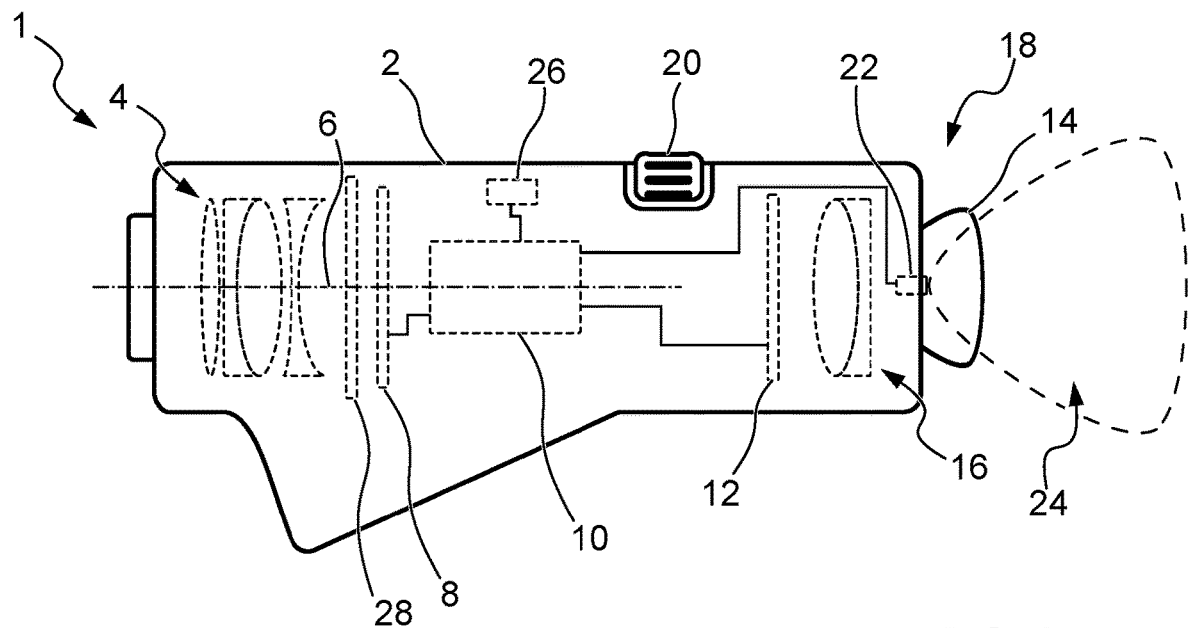
FIG. 1 shows a schematic side view of an electro-optic observation device.

FIG. 1 schematically illustrates an electro-optic observation device, here specifically a thermal imaging spotting scope (for short: thermal imaging device 1). The thermal imaging device 1 includes a handheld device housing (for short: housing 2). An entrance-side lens group 4 and, downstream in a "radiation transmission direction 6", an image capture unit in the form of an image sensor 8 (also: image converter) are arranged in the housing 2. The image sensor 8 is coupled to a control device (referred to here as "controller 10") in terms of signal transmission. The controller 10 is coupled on the output side to an image display unit, here in the form of a display 12, and is configured to process an image received with the image sensor 8 and to output said image in processed form to the display 12 for the purpose of being displayed. Furthermore, the thermal imaging device 1 includes an eyepiece 14 (and, in the exemplary embodiment illustrated, optionally a "second" lens group 16 assigned to the eyepiece 14), through which a user can view the processed and displayed image. The display 12, the eyepiece 14 and the lens group 16 form an electronic viewfinder 18.

In order to be able to effect settings on the displayed image, i.e., in order to be able to user-specifically adapt the display of said image, the thermal imaging device 1 furthermore includes a rotary wheel 20 as setting means. The latter is arranged on the exterior of the housing 2 in a manner accessible to a user.

Furthermore, the thermal imaging device 1 includes a proximity sensor 22 arranged in the region of the viewfinder 18. With the proximity sensor 22, the controller 10 is configured to monitor a distance range 24, arranged outside the housing 2 (e.g., approximately 4 cm) around the viewfinder 18, specifically the eyepiece 14 thereof, for the presence of an object, in particular a person, specifically a user of the thermal imaging device 1.

In the exemplary embodiment illustrated, the thermal imaging device 1 additionally also includes a position sensor 26, here specifically a three-axis or 3D acceleration sensor. The position sensor 26 serves to capture a position variable GL that is characteristic of the orientation of the thermal imaging device 1 (see FIG. 2, for example). In the present exemplary embodiment, the position variable GL describes the orientation of the radiation transmission direction 6 (or else of the optical axis) in space.

Figure 2:
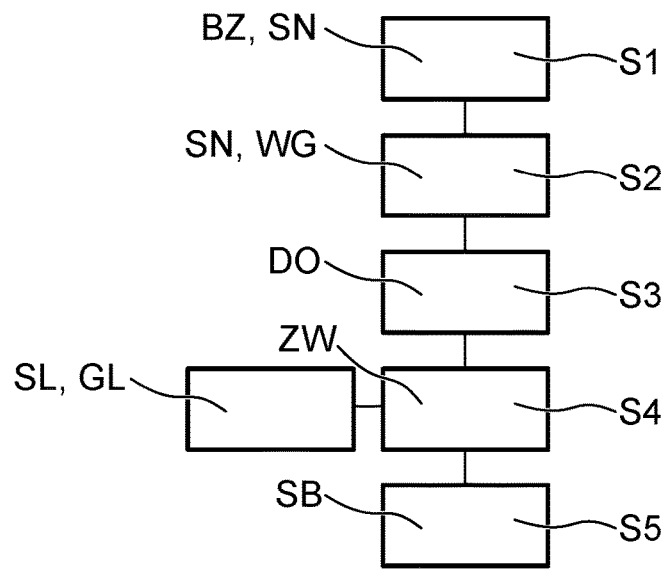
FIGS. 2 to 4 each show a schematic flow diagram of a respective method carried out by a control device of the observation device.

FIG. 2 schematically illustrates a method for operating the thermal imaging device 1, which is carried out automatically by the controller 10. Firstly, the thermal imaging device 1 here is in a normal operating state BZ, in which a user views the image based on temperature differences which is presented in the viewfinder 18. During the normal operating state BZ, the controller 10 in a first method step S1 monitors the proximity sensor 22, specifically the sensor signal SN thereof, for changes. If the user puts down the thermal imaging device 1, the proximity sensor 22 in a second method step S2 outputs a changed sensor signal SN, which is in turn registered by the controller 10. In this case, if the current value of the sensor signal SN exceeds a threshold value WG indicative of an absence of the user in the distance range 24, the controller 10 in a third method step S3 controls the display 12 to change over to an inactive state DO. To put it another way, the controller 10 switches off the display 12. As a result, advantageously, light emanating from the display 12 can no longer be emitted into the surroundings.

Furthermore, the controller 10 also monitors the position sensor 26, specifically the sensor signal SL thereof. The controller 10 derives the position variable GL from the sensor signal SL in order to assess at what position (location) the thermal imaging device 1 is situated. If the position variable GL is indicative, e.g., of a state in which the thermal imaging device 1, with its radiation transmission direction 6, faces approximately vertically upwards and carries out only slight, in particular pendulum-like movements, the controller 10 in a fourth method step S4 assumes that the thermal imaging device 1 is currently hanging from a carrying strap, e.g., around the user's neck. In this case, the controller 10 interprets this (use) situation as non-use and in a fifth method step activates a standby state SB, in which at least the image capture and image processing are switched off. Optionally, the controller 10 monitors the position variable GL also to the effect of whether a significant change in the position of the thermal imaging device 1 is present after the user moves away from the distance range 24. This is the case, e.g., if the user firstly holds the thermal imaging device 1 almost horizontally (or if appropriate also obliquely) in front of their eye in order to observe something and subsequently puts down the thermal imaging device 1 and lets it hang around their neck. Optionally, the controller 10 deduces the non-use and activates the standby state SB only when the significant change in position was also able to be established.

In a further optional variant, the controller 10 in the fourth method step S4 starts a waiting time ZW if the significant change in position was established. The standby state SB is not activated within the waiting time ZW, but rather only at the end thereof, provided that the position variable GL does not indicate the thermal imaging device 1 being put in position again and/or the sensor signal SN of the proximity sensor 22 does not indicate the presence of the user at the viewfinder.

To put it more generally, the controller 10 derives information about the current use situation from the sensor signal SN and the sensor signal SL, in particular the position variable GL, and controls at least, here specifically in each case, one specific function of the thermal imaging device 1 that influences an image display (inactive state DO of the display 12 and standby state SB).

Figure 3:
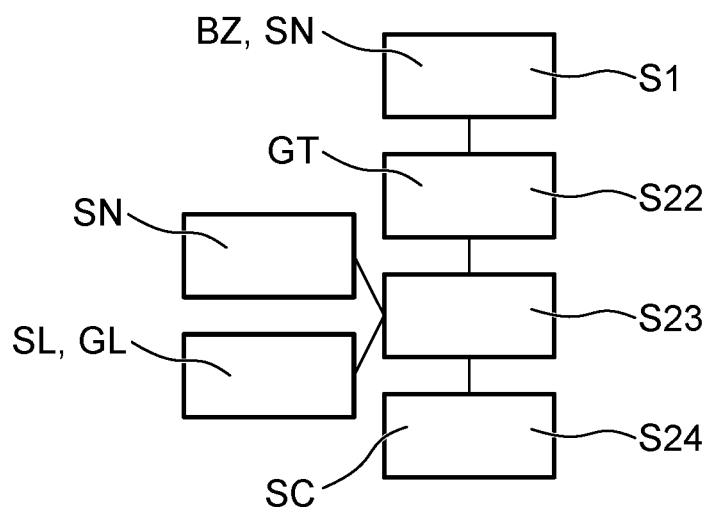

FIG. 3 illustrates an alternative or optionally additional method that is carried out by the controller 10. In this case, the first method step S1 corresponds to the normal operating state BZ as described above. Besides the sensor signal SN (and also the sensor signal SL), the controller 10 also monitors temperature values of the image sensor 8. The controller 10 here has temperature limit values GT stored, which when exceeded (second method step S21) indicate a loss of contrast. In order to reduce this loss of contrast, the thermal imaging device 1 includes a reversibly closable shutter 28 disposed upstream of the image sensor 8. This shutter 28 is closed, such that the image sensor 8 can be calibrated. Since the last image usually continues to be displayed to the user for the time of the closed shutter 28, this procedure is unsatisfactory for the user. Therefore, the closing of the shutter 28 is prevented during the normal operating state BZ. In a third method step S23, however, the controller 10 checks whether the thermal imaging device 1 is still being used by the user, i.e., whether the user is currently viewing a thermal image through the viewfinder 18. For this purpose, the controller 10 evaluates at least the sensor signal SN as to whether the user is present within the distance range 24 (cf. method step S2 according to FIG. 2). If the controller 10 here can deduce that the user does not have the viewfinder 18, specifically the eyepiece 14, in front of their eye (specifically since the sensor signal SN exceeds the limit value), the controller 10 in a fourth method step S24 enables a shutter closing function SC ("shutter closed"), i.e., the closing of the shutter 28.

In an optional variant of this exemplary embodiment, in the third method step S23, the controller 10 additionally checks whether the position variable GL likewise indicates non-use, namely—in a manner comparable with method step S4 in accordance with FIG. 2—whether the radiation transmission direction 6 extends approximately vertically or the like. By contrast, a horizontal orientation of the radiation transmission direction 6, without a significant change in position while or after the user moves away from the distance range 24, is interpreted to the effect that the user has only moved their eye away from the viewfinder 18, but is still using the thermal imaging device 1. The shutter closing function SC is still prevented in this case.

Optionally, the shutter closing function SC can also be triggered during (typically at the beginning of) the waiting time ZW in method step S4 in accordance with FIG. 2. For the case where the user guides the thermal imaging device 1 back to their eye within the waiting time ZW, a calibrated image can thus be viewed.

In an exemplary embodiment that is not illustrated in more specific detail, the shutter closing function SC is triggered if what is derived from the position variable GL is the fact of the user picking up the thermal imaging device 1 from a rest position (or the above-described state hanging from the carrying strap) of the thermal imaging device 1 (e.g., with the radiation transmission direction 6 oriented vertically) and putting it in position (again), i.e., guiding it to their eye.

Figure 4:
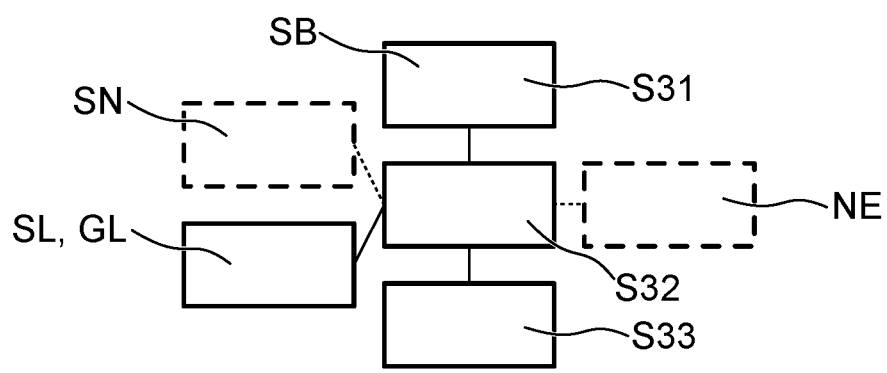

FIG. 4 illustrates one exemplary embodiment for deactivating the standby state SB. During the standby state SB, the controller 10 in a first method step S31 operates the position sensor 26 in reduced-power operation. By way of example, in this case, a change in the use situation is checked with the position sensor 26 only at intervals, optionally at significantly lengthened intervals by comparison with normal operation (intervals at least doubled by comparison therewith, optionally e.g., every 3 to 5 seconds). In a second method step S32, the controller 10 captures a significant signal change and thus a significant change in the position variable GL. Significant is understood here to mean in particular that the position variable GL changes comparatively rapidly and/or to such a great extent that this indicates deliberate handling, e.g., picking up, of the thermal imaging device 1, and thus a change in the use situation.

The controller 10 in a third method step S33 thereupon deactivates the standby state SB and thus activates the proximity sensor 22, the image sensor 8 and the display 12 and also the image capture and image processing.

In an optional exemplary embodiment, the controller 10 also already uses the proximity sensor 22 during method step S32 in order to capture a change in the use situation (indicated by dashed lines in FIG. 4).

In a further optional exemplary embodiment, the controller 10 also uses a user input NE during method step S32 in order to recognize the change in the use situation and to instigate the standby state SB.

The subject matter of the disclosure is not restricted to the exemplary embodiments described above. Rather, further embodiments of the disclosure can be derived from the above description by a person skilled in the art. In particular, the individual features of the disclosure described with reference to the various exemplary embodiments and the design variants thereof can also be combined with one another in a different way.

LIST OF REFERENCE NUMERALS

1 Thermal imaging device
2 Housing
4 Lens group
6 Radiation transmission direction
8 Image sensor
10 Controller
12 Display
14 Eyepiece
16 Lens group
18 Viewfinder
20 Rotary wheel
22 Proximity sensor
24 Distance range
26 Position sensor
28 Shutter
GL Position variable
BZ Operating state
SN Sensor signal
WG Threshold value DO Inactive state
SL Sensor signal
SB Standby state
ZW Waiting time
GT Temperature limit value
SC Shutter closing function
NE User input
S1 to S4 Method step
S22 to S24 Method step
S31 to S33 Method step

What is claimed is:

1. A method for operating a thermal imaging device, the thermal imaging device including a shutter, an image converter, an electronic viewfinder, at least one of a proximity sensor and a position sensor, and the shutter being arranged in a beam path upstream of the image converter, the method comprising:
at least one of (a) monitoring a predefined distance range in front of the electronic viewfinder with the proximity sensor for a presence of a user, and (b) capturing, with the position sensor, a position variable which is characteristic of an orientation of the thermal imaging device;
deriving information concerning a current use situation of the thermal imaging device from at least one of (c) the presence of the user within the predefined distance range, and (d) the position variable; and
activating or at least enabling at least one specific function of the thermal imaging device which influences an image display depending on the information concerning the current use situation.

2. The method according to claim 1, further comprising deactivating the electronic viewfinder when the information includes at least an absence of the user within the distance range.

3. The method according to claim 2, wherein the electronic viewfinder is deactivated when a user-specifically settable first waiting time since registration of the absence of the user within the distance range has additionally elapsed.

4. The method according to claim 1, further comprising activating a standby state of the thermal imaging device when the information additionally indicates at least one of non-use, putting down, and non-movement of the thermal imaging device.

5. The method according to claim 4, wherein activating the standby state is prevented when the non-movement was already present before the registration of the absence of the user.

6. The method according to claim 5, wherein after the registration of the at least one of the non-use, the putting down, and the non-movement, and after the registration of the absence of the user, the activation of the standby state is preceded by waiting for a second waiting time to elapse.

7. The method according to claim 1, wherein, when the information includes at least absence of the user within the distance range, the method further comprises enabling a closing function of the shutter in the beam path upstream of the image converter of the thermal imaging device.

8. The method according to claim 7, wherein the closing function is enabled or forced during at least one of the first and second waiting time.

9. The method according to claim 1, wherein the position variable is evaluated to determine whether a movement that is characteristic of guiding the thermal imaging device to a face of the user is present, and
wherein, when such a movement is recognized, the closing function is triggered.

10. The method according to claim 1, wherein the position sensor is a 3-axis acceleration sensor.

11. The method according to claim 1, further comprising applying pattern recognition to a signal of the position sensor for recognizing a specific movement.

12. The method according to claim 1, further comprising applying pattern recognition to a signal of the position sensor for recognizing whether at least one of putting down, guiding to the face, and a specific position of the thermal imaging device is present.

13. The method according to claim 4, further comprising deactivating the standby state depending on the information about the current use situation or when at least one of a position change and a movement is captured at least with the position sensor.

14. The method according to claim 4, further comprising deactivating the standby state when at least one of a position change and a movement is captured with the position sensor.

15. The thermal imaging device, comprising:
the image converter;
the shutter arranged in the beam path upstream of the image converter;
the electronic viewfinder; and
at least one of:
the proximity sensor configured to monitor the predefined distance range in front of the electronic viewfinder for a presence of the user;
the position sensor configured to capture the position variable which is characteristic of the orientation of the thermal imaging device; and
a controller configured to carry out the method according to claim 1.

* * * * *